United States Patent
Jansen et al.

(10) Patent No.: US 6,243,450 B1
(45) Date of Patent: Jun. 5, 2001

(54) PAY-PER USE FOR DATA-NETWORK-BASED PUBLIC ACCESS SERVICES

(75) Inventors: Bernie G. Jansen, Brampton; Tomasz Celkowski, Richmond Hill; Nick Isgro, Scarborough, all of (CA)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 09/220,963

(22) Filed: Dec. 28, 1998

Related U.S. Application Data

(63) Continuation-in-part of application No. 08/928,519, filed on Sep. 12, 1997, now Pat. No. 6,118,860.

(51) Int. Cl.[7] .................................................. H04M 17/00
(52) U.S. Cl. ................. 379/144; 379/100.04; 379/91.01; 379/114; 705/400
(58) Field of Search .................... 379/144, 114, 379/112, 91.01, 201, 900, 100.04; 370/352; 395/200.3, 200.33, 200.55, 200.59; 705/400; 709/200, 93.09

(56) References Cited

U.S. PATENT DOCUMENTS

| | | | |
|---|---|---|---|
| D. 378,082 | 2/1997 | Wilson | D14/100 |
| 4,900,905 | 2/1990 | Pusic | 235/381 |
| 5,146,491 | 9/1992 | Silver et al. | 379/114 |
| 5,174,056 | 12/1992 | King | 40/574 |
| 5,393,964 | 2/1995 | Hamilton et al. | 235/381 |
| 5,481,534 | 1/1996 | Beachy et al. | 370/60 |
| 5,504,744 | 4/1996 | Adams et al. | 370/60.1 |
| 5,537,464 | * 7/1996 | Lewis et al. | 379/114 |
| 5,572,005 | * 11/1996 | Hamilton et al. | 379/114 |
| 5,602,905 | 2/1997 | Mettke | 379/96 |
| 5,621,787 | * 4/1997 | McKoy et al. | 379/114 |
| 5,625,677 | 4/1997 | Feiertag et al. | 379/93 |
| 5,710,807 | 1/1998 | Smith | 379/114 |
| 5,710,918 | 1/1998 | Lagarde et al. | 395/610 |
| 5,712,907 | * 1/1998 | Wegner et al. | 379/112 |
| 5,729,594 | 3/1998 | Klingman | 379/93.12 |
| 5,757,784 | * 5/1998 | Liebowitz et al. | 379/114 |
| 5,761,071 | 6/1998 | Bernstein et al. | 364/479.07 |
| 5,799,060 | 8/1998 | Kennedy et al. | 379/29 |
| 5,805,636 | 9/1998 | Rao et al. | 375/222 |
| 5,812,765 | 9/1998 | Curtis | 395/200.3 |
| 5,822,215 | 10/1998 | Hohmann et al. | 364/479.01 |
| 5,838,682 | 11/1998 | Dekelbaum et al. | 370/401 |
| 5,845,267 | 12/1998 | Ronen | 705/40 |
| 5,875,110 | 2/1999 | Jacobs | 364/479.02 |
| 5,881,141 | 3/1999 | Park | 379/155 |
| 5,898,763 | 4/1999 | Azuma et al. | 379/100.04 |
| 5,923,736 | 7/1999 | Shachar | 379/93.17 |
| 5,946,670 | * 8/1999 | Motohashi et al. | 705/400 |
| 5,953,504 | 9/1999 | Sokal et al. | 379/200.57 |
| 6,009,154 | * 12/1999 | Rieken et al. | 379/114 |
| 6,111,861 | * 8/2000 | Burgess | 370/286 |

\* cited by examiner

*Primary Examiner*—Curtis Kuntz
*Assistant Examiner*—Rexford Barnie
(74) *Attorney, Agent, or Firm*—Kevin L. Smith; Bracewell & Patterson, L.L.P.

(57) ABSTRACT

An apparatus for vending public multimedia services has a telephone, a multimedia terminal, a payment receiver for receiving an authorization to accept charges for enabling use of at least one of the telephone and the multimedia terminal, a file receiver for receiving a file, the file containing a field with cost per unit time for a service and a field with a modifier for the cost per unit time for the service, memory for storing the file, and a usage cost determiner for determining a usage cost based on a time of use of the service and information in the file.

6 Claims, 15 Drawing Sheets

SERVICE RECORD

| SERVICE ID | SERVICE TYPE | SERVICE RATE |
|---|---|---|
| = | = | = |
| = | = | = |
| = | = | = |

Fig. 9

SERVICE USAGE RECORD

| TRANSACTION ID | SERVICE ID | DATE/TIME | DURATION | CHARGE | PAYMENT METHOD | CARD NUMBER |
|---|---|---|---|---|---|---|
| = | = | = | = | = | = | = |
| = | = | = | = | = | = | = |
| = | = | = | = | = | = | = |

Fig. 11

PAY-PER USE FOR DATA-NETWORK-BASED PUBLIC ACCESS SERVICES

CROSS-REFERENCE TO RELATED APPLICATION

This application is a continuation-in-part of application Ser. No. 08/928,519 filed Sep. 12, 1997 now U.S. Pat. No. 6,118,860, and entitled "PUBLIC COMMUNICATIONS SERVICES VENDING METHOD AND APPARATUS".

CROSS-REFERENCE TO RELATED APPLICATION

This application is related to application Ser. No. 08/928,519 filed Sep. 12, 1997 and entitled "PUBLIC COMMUNICATIONS SERVICES VENDING METHOD AND APPARATUS".

FIELD OF THE INVENTION

The present invention relates to pay-per use for data-network-based public access services and is particularly concerned with providing a method and apparatus for providing pay-per use billing to end-users of public access services available through an Internet-accessible kiosk or terminal.

BACKGROUND OF THE INVENTION

A public multimedia system is a combination of public terminals, such as telephones and personal computers and includes a method or apparatus to administer these public terminals and a method or apparatus for hosting application computer programs on this system. The application programs that are hosted on such a system include network-driven tools such as e-mail and secure commerce transactions for online purchases. When deployed in public locations such as airport departure lounges, public thoroughfares, shopping malls, banks, movie theatres and retail stores the terminals may be referred to as kiosks, booths, internet kiosks, networked multimedia kiosks, or web payphones.

These kiosks may be used to provide messaging services such as e-mail and fax, form-entry services for banks and governments, electronic commerce such as ticketing and virtual shopping malls, entertainment such as Internet access, games and chat rooms, and public utilities such as pay telephony.

The information age places new demands on people to be "connected" to various networks, both public and private. People not connected to these networks through travel, time constraints, or financial resources, may be placed in economic or social disadvantage. Public multimedia systems, can reliably provide these vital connections to travellers and to those without the necessary equipment to access theses information networks.

Various services can be provided to kiosk users. Some services, such as on-line maps or guidebooks, may be provided free-of-charge. Other services, known as loyalty programs, may be provided free-of-charge to identified customers of the service providers. Other services, such as e-mail, may require the kiosk user to pay for use of the services. These pay-per-use services include not only e-mail, but event ticketing, provision of proprietary information to the kiosk user, games, Internet access and printing materials associated with these services.

Individuals who use pay-per-use services can be charged different rates for different services. For example, Internet access could be charged at a different rate than reading or writing e-mail.

As well, it would be desirable when charging a fee for network-based services, to take into account the data throughput on the network when billing for services.

More generally, it would be desirable to offer a number of different billing options and features in pay-per-use services hosted by public multimedia systems.

SUMMARY OF THE INVENTION

An object of the present invention is to provide an improved method and apparatus for pay-per-use services for Web-Based Public Access Services.

In one aspect of there is provided an apparatus for vending public multimedia services, the apparatus including: (a) a telephone, (b) a multimedia terminal, and (c) a card reader associated with the telephone for receiving an authorization to accept charges for enabling use of the multimedia terminal. In another aspect of the present invention there is provided an apparatus for vending public multimedia services, the apparatus comprising; (a) a telephone, (b) a multimedia terminal; (c) a payment receiver for receiving an authorization to accept charges for enabling use of at least one of the telephone and the multimedia terminal, (d) a file receiver for receiving a file, the file containing service rate information and, (e) memory for storing said service rate information. In a nother aspect of the present invention there is provided a method for displaying billing rate information on a public multimedia kiosk including: (a) receiving an inquiry from a user about a pay-per-use service, (b) displaying service rate information to the user, (c) querying the user if they wish to receive the pay-per-use service, and, (d) providing the pay-per-use service upon receiving a positive response to the query.

In another aspect of the present invention there is provided a method for modifying a usage charge for a pay-per-use service based on a data arrival rate including: (a) calculating the data arrival rate over a period of time, (b) comparing the data arrival rate to at least pre-stored value; (c) calculating a charge modifier based on the comparison, and, (d) calculating a usage charge based on the charge modifier.

BRIEF DESCRIPTION OF THE DRAWINGS

FIG. 9 is a schematic representation of a service record according to the first embodiment of the invention;

FIG. 11 is a schematic representation of a service usage record according to the first embodiment of the invention;

DETAILED DESCRIPTION

FIG. 1

Figure 1:
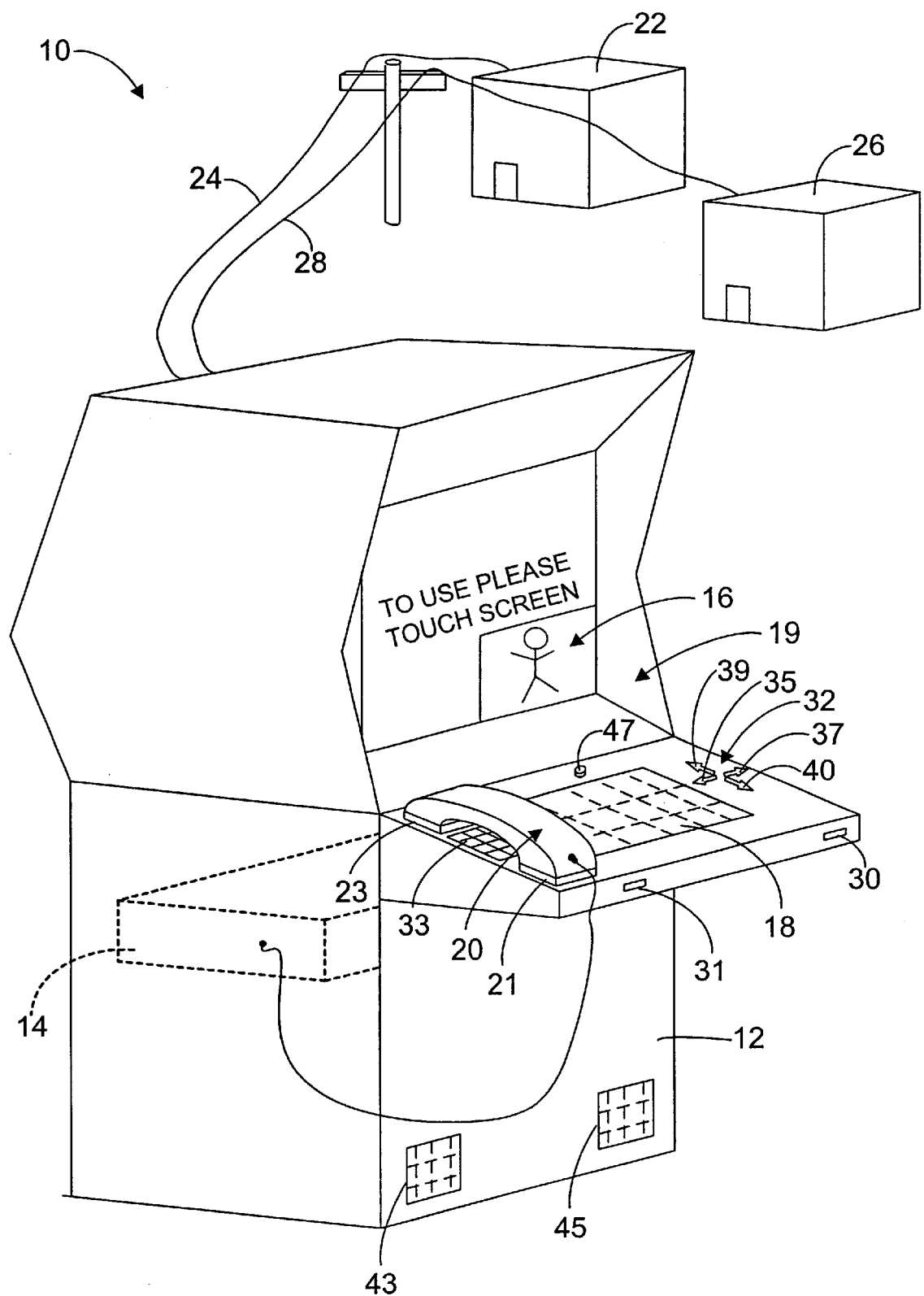
FIG. 1 is a schematic representation of an apparatus according to a first embodiment of the invention.

Referring to FIG. 1, an apparatus for vending public multimedia services, according to a first embodiment of the invention is shown generally at 10. The apparatus includes a public multimedia services kiosk apparatus having a base 12 in which is mounted a computer 14, a display 16 and a keyboard 18, together acting as a multimedia terminal 19. The display preferably includes a touchscreen. The base 12 also has a telephone mounted thereon, the telephone being shown generally at 20.

The telephone 20 is in communication with a public telephone network 22 via a central office telephone line 24. Alternatively, the telephone 20 may be in communication with the internet and capable of receiving voice over the internet. The telephone includes a microphone 21 and a speaker 23, the telephone receiver being operable to communicate audio signals to a user.

The computer 14 is connected to a central server 26 by a communications line 28 which may include an Ethernet base T connection. Between computer 14 and central server 26 there may be a variety of interface devices such as a local area network, a modem or an ISDN network adaptor.

Both telephone 20 and computer 14 could be connected to their respective networks by way of a wireless connection.

Also mounted on the base 12 is a credit card reader 30, a printer 31 and an optional telephone dial pad 33. Alternatively, the kiosk may have two printers, one for printing documents such as letters and one for printing receipts. Also mounted on the base are physical scroll actuators shown generally at 32, which are in communication with the computer 14 for directing the computer 14 to effect functions associated with the display 16. The physical scroll actuators include left, right, up and down actuators 35, 37, 39 and 40 for receiving user input for scrolling information displayed by the display left, right, up and down respectively, line by line or page by page. Alternatively, instead of scroll actuators a trackpad could be used to input scrolling information.

Also secured to the base are one or more speakers 43 for communicating audio signals to a user, in connection with multimedia services provided at the multimedia terminal. An optional volume control 47 common to the telephone receiver 23 and the one or more speakers 43 includes first and second actuator buttons mounted on the base 12 for selectively controlling the volume of signals produced by telephone receiver 23 or the one or more speakers 43, depending upon which of the telephone and multimedia terminal 19 is in use by a user.

FIG. 2

Figure 2:
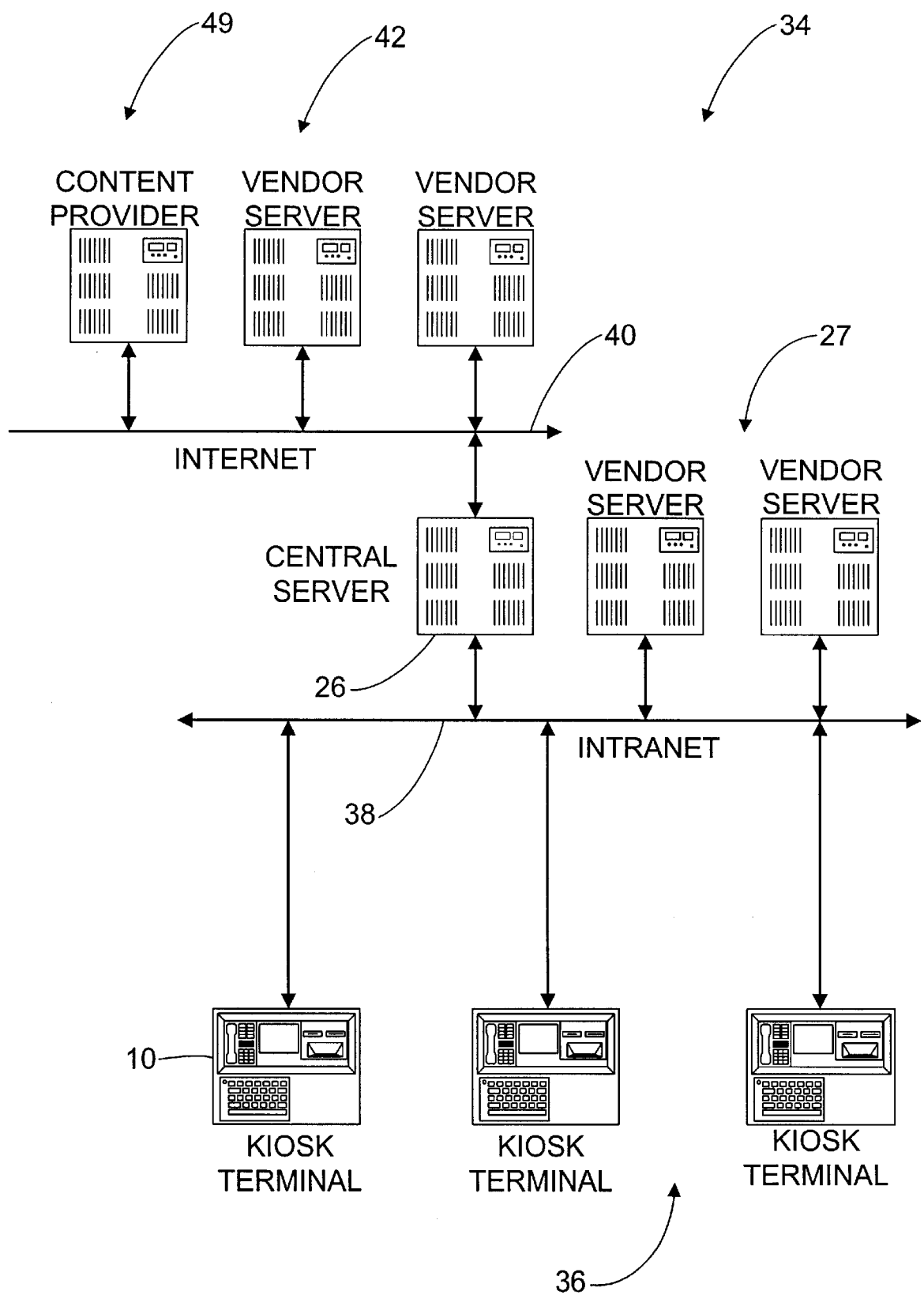
FIG. 2 is a schematic diagram of a network to which the apparatus of FIG. 1 is connected.

Referring to FIG. 2, a schematic diagram of the connection of the computer 14, shown in FIG. 1 to the central server 26 is shown generally at 34.

In this embodiment, the public multimedia services kiosk apparatus 10 is one of a plurality 36 of kiosk apparatus connected to an intranet 38 private network on the communications line 28 in communication with the central server 26. A plurality 27 of vendor servers are also connected to the intranet 38, for communication with the central server 26. The vendor servers can provide pay-per-use services or free services or both to kiosk apparatus 10 or may also provide credit or payment authorization services. The central server 26 is further in communication with the Internet 40 to which a plurality of further vendor servers 42 and content servers 49 are connected. Again these vendor servers may include credit or payment authorization servers. Thus, the vendor servers 27 are in communication with the central server 26, and the central server 26 is in communication with the kiosk apparatus 36. Communication with the central server 26 can also be achieved over the public switched telephone network ("PTSN") 22 (shown in FIG. 1). Similarly, communication with the credit card or payment authorization servers can be achieved over the public switched telephone network 22 (shown in FIG. 1).

FIG. 3

Figure 3:
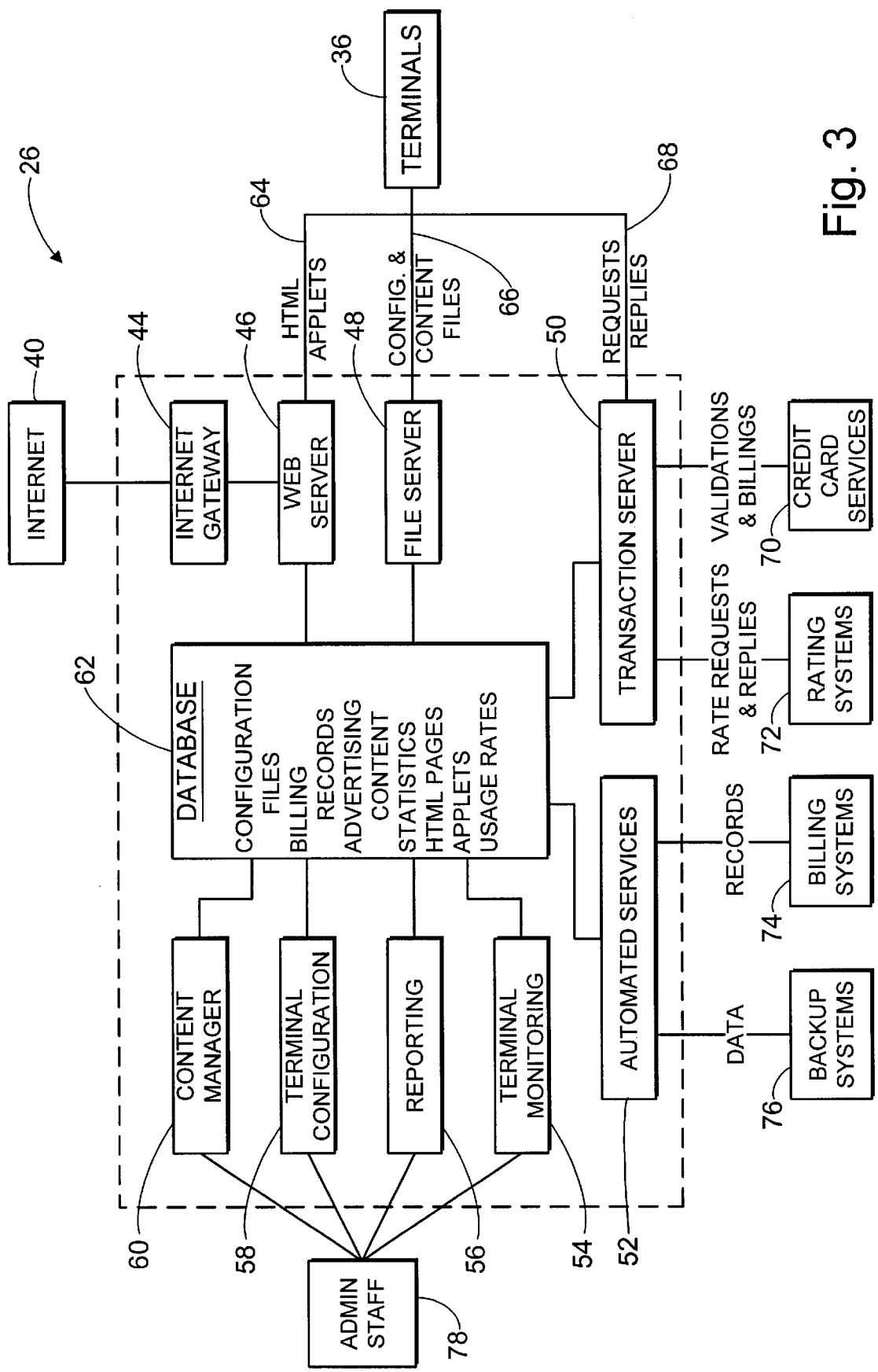
FIG. 3 is a block diagram of a central server according to the first embodiment of the invention.

Referring to FIG. 3, a block diagram of the central server 26 in FIG. 2 is shown generally at 26. The central server includes an internet gateway interface 44, a web server interface 46, a file server interface 48, a transaction server interface 50, an automated services interface 52, a terminal monitoring interface 54, a reporting interface 56, a terminal configuration interface 58, a content manager interface 60 and a database 62.

The internet gateway interface 44 provides a high speed dedicated high bandwidth connection such as a T1 connection to the Internet 40, for receiving HTML pages or at least one multimedia file from an Internet provider and for providing uniform resource locators (URLs) to vendor servers (42 in FIG. 2) and content providers (43 in FIG. 2) connected to the Internet 40. Internet gateway interface 44 could also be a modem.

The Internet gateway interface 44 is also in communication with the web server interface 46 which is communication with the database 62 and is in communication with the kiosk terminals 36 by way of an HTML/applet pipe 64. The web server interface 46 is thus able to transmit HTML pages and applet programs to the kiosk apparatus 36 by way of the HTML/applet pipe 64. In addition, the web server interface 46 is operable to provide content files from the database 62 to the Kiosk apparatus 36 through the HTML/applet pipe 64. Effectively, the web server determines the type of content requested by a kiosk and extracts the requested files from the database 62 or the Internet 40 and transmits the requested files to the public multimedia services kiosk apparatus 36.

The file server interface 48 is also in communication with the database 62 and with kiosk apparatus 36. Communication with the apparatus is conducted by way of a configuration and content file pipe 66 by way of which configuration and content files obtained from the database 62 are transmitted by the file server interface 48 to the kiosk apparatus 36.

The transaction server interface 50 is further in communication with the database 62 and with the kiosk apparatus 36. Communication between the transaction server and the kiosk apparatus 36 is provided by a request/reply pipe 68. The transaction server is thus able to receive request messages from the kiosk apparatus 36, interpret such requests, and transmit suitable replies on the request/reply pipe 68. The transaction server is further in communication with a credit card service 70 such as a Chemical Bank and is preferably further in communication with at least one rating system 72 which, in this embodiment, includes the MORRIS (trademark) rating system offered by Bell-Canada. Alternatively the credit-card service 70 or rating system 72 could communicate directly with kiosk apparatus 36 over the internet or any other communication network. The transaction server interface 50 communicates with the credit card service 70 by transferring validations and billings. Validations include requests from the transaction server interface 50 for card validation to authorize charges to appear on a card and include the transfer of billing information, such as amounts and card numbers to which charges are to be applied by the credit card service 70.

It should be noted that other methods of payment authorization or validation can be implemented at kiosk apparatus 36. If the payment is made using a stored value smart card, validation may occur by way of the user entering a personal identification number (PIN) or by presenting some biometric verification such as fingerprint which is matched to data stored on the smart card. Payment may also be made by way of a pre-paid value card, in which case, no authorization may be required. Alternatively, payment could be by way of a debit card, which would then require verification of identity and account balance at some authorization server.

The transaction server interface 50 also communicates with the credit or debit card service to store files in the database, relating to local card clearing information. The transaction server interface 50 communicates rate requests and receives replies from the rating system 72, in relation to telephone billing rates, commercial services rates, etc. Rate requests are made by the transaction server to the rating system 72 and the rating system 72 replies with the requested rates. Such rates are then provided to the kiosk apparatus 36 by way of the request reply pipe 68. Alternatively, rate information could be provided directly by content servers, by central server 26 or could stored in kiosk apparatus 36. The information could be exchanged between the servers and the kiosk by way of the hypertext transport protocol (HTTP), the Common Object Request Broker Architecture (CORBA), or the Open Database Connectivity (ODBC) architecture, or TCP/IP.

The automated services interface 52 is in communication with the database 62, a billing system 74 and a backup system 76. The automated services interface 52 provides billing records to the database 62 and to off-premises billing systems 74 and further provides data relating to the contents of the database 62 to backup systems 76.

The terminal monitoring interface 54, reporting interface 56, terminal configuration interface 58 and content manager interface 60 are all in communication with an administrative staff terminal 78 which administrative staff use to configure the central server 26 and monitor its functions. The terminal monitoring interface 54 effectively provides to the administrative staff terminal 78 a typical control room interface and maintains a monitor of alarms associated with various functions of the central server, for example, loss of communication to any one of the kiosk apparatus 36. The terminal monitoring interface 54 maintains an alarm table in the database 62.

The reporting interface 56 monitors transactions between the central server and the database to accumulate statistics regarding the amount of money made by each kiosk apparatus 36 and the number of times particular services are used. The reporting interface 56 thus stores statistical files and usage rate files in the database 62.

The terminal configuration interface 58 is used to receive operational information from operators, such as timeout numbers, screen information, etc., serial number of units, service records including service identifications, service types and service rates etc. and stores such information in the database 62 as configuration files which identify how a apparatus is to be configured to present multimedia services to a user.

The content manager interface 60 receives advertising and information regarding user interface buttons, from the administrative staff terminal 78. The content manager interface 60 stores such information as advertising content files, HTML pages and applets in the database 62.

The database 62 thus includes configuration files for configuring apparatus 36 to present multimedia services to a user, billing records, advertising or multimedia content files for providing multimedia content to the apparatus, statistical information relating to services rendered, HTML pages and multimedia files received from an Internet provider for use at the apparatus, applets for execution at the apparatus, usage rates, an alarm table, and local credit card information for validating credit cards used at the apparatus.

Each of the interfaces of the central server 26 includes respective program steps for directing a computer within the central server to perform the indicated interface functions.

The central server may be a single computer or may be formed over a distributed network. In general, such a single computer or distributed network acts as a transmitter for transmitting for receipt by at least one public communications services kiosk apparatus 36, over a private network, a multimedia configuration file for configuring the apparatus to present multimedia services to a user. Such transmitter also transmits multimedia content files of actual multimedia content available to users at the public communications services kiosk apparatus.

FIG. 4

Figure 4:
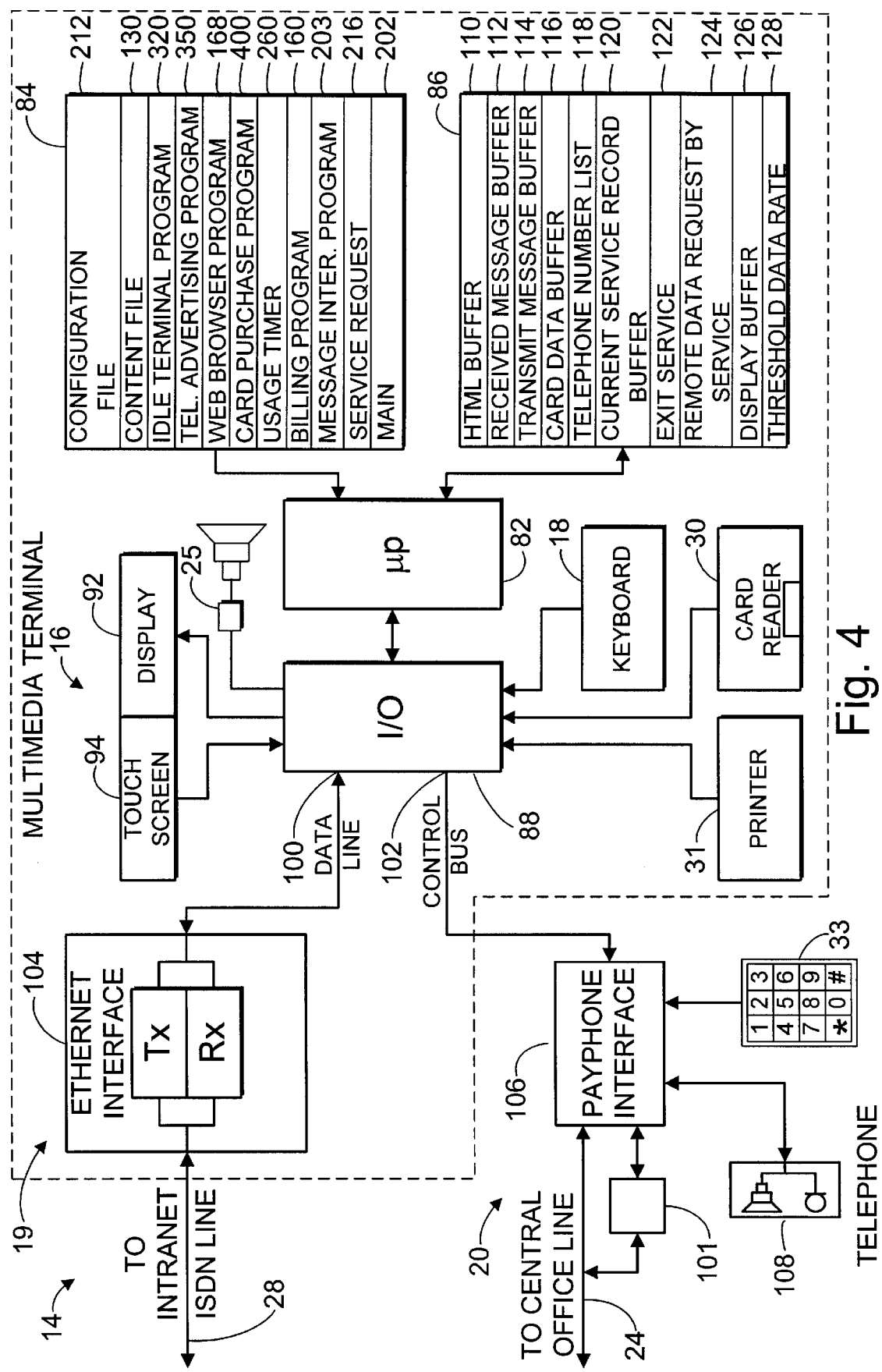
FIG. 4 is a block diagram of an electronic circuit according to a first embodiment of the apparatus.

Referring to FIG. 4, a block diagram of the kiosk apparatus computer 14 is shown. The kiosk apparatus effectively includes a multimedia terminal 19 and a telephone 20.

The multimedia terminal portion includes a microprocessor 82 in communication with non-volatile memory 84, volatile memory 86 and an I/O port 88. The I/O port is in communication with display 16 which includes a video display 92 and a touchscreen 94, each individually in communication with the I/O port 88. In this embodiment, the display and touchscreen are integrated into a single unit approximately 10 to 12 inches diagonal and has an adjustable viewing cone for public and private usage applications.

The I/O port is further in communication with the printer 31, the keyboard 18 and a speaker driver 25 for driving the speakers 43 and 45. The I/O port also has first and second communications ports 100 and 102, the first communications port 100 being connected to an Ethernet interface 104 which is connected to the intranet via a high speed connection such as an ISDN line and is operable to signal to the microprocessor through the I/O port an indication of whether or not a message has been received and whether or not a complete transmission of a file has been received.

The second communications port 102 is connected to a pay phone interface which is connected to the central office line 24. Also, connected to the pay phone interface, are, optionally, the telephone dial pad 33 and a handset 108 on which is mounted the microphone 21 and receiver 23.

Preferably, pay phone interface 106 comprises a second microprocessor which will have associated volatile and non-volatile memory. The second microprocessor contains computer programs for controlling the pay phone operation. Optionally, card reader 30 is connected to pay phone interface 106 or to I/O port 88 so that card verification and authorization occurs through pay phone interface 106.

In effect, the microprocessor 82 is in communication with the display 16, the printer 31, the keyboard 18 and the speaker driver 25, the Ethernet interface 104 and the pay phone interface 106 via the I/O port 88.

Figure 5:
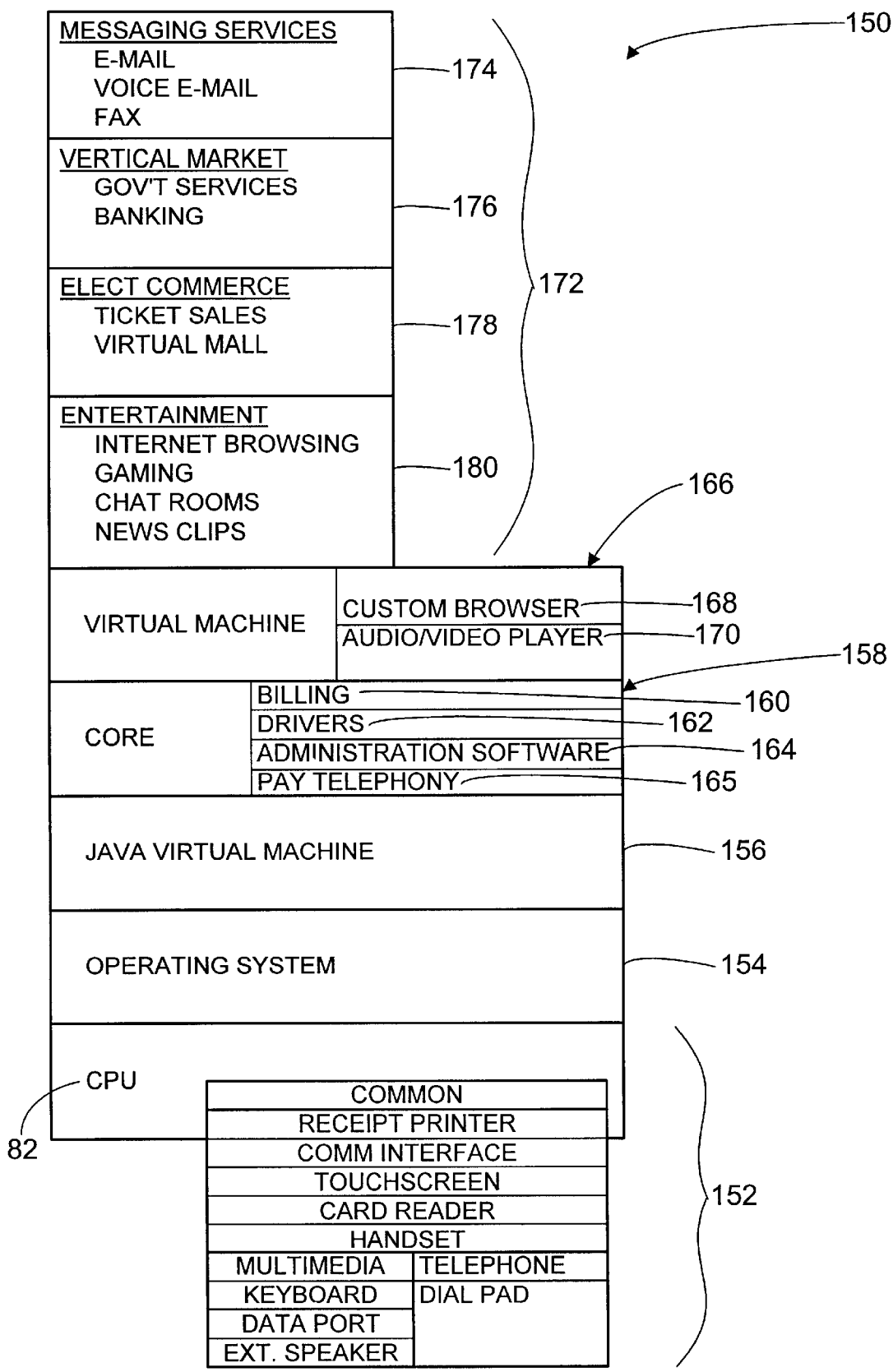
FIG. 5 is a schematic diagram of a computer architecture employed in the apparatus according to the first embodiment of the invention.

The pay phone interface is operable to pick up and drop the central office line and includes a sensor 101 to indicate to the second communications port 102, whether or not the central office line is in use by the pay phone interface 106.
FIG. 5

Referring to FIG. 5, the architecture of the multimedia apparatus is shown generally at 150. The architecture includes the components shown in FIG. 4 in a hardware layer 152 thereof.

The architecture further includes an operating system 154. The operating system in this embodiment, is of the type provided by Microware, known as OS/9 (trademark), MAC OS/8, VXWorks, Microsoft NT, CHORUS, LINUX, SOLARIS or others. The properties of this operating systems are that it has high recoverability, it is suitable for real time operation, it has compatibility with the indicated hardware devices, it has built-in fault recovery, and it is well supported by the microprocessor. In addition, this operating system is licensed to interact with the Java programming language.

The architecture further includes a Java virtual machine 156 which allows programs to run without recompiling. Java also provides an easy high level interface and has a convenient class library which gives programmers a convenient application programmatic interface (API) set.

The architecture further includes a core program layer 158 including billing programs 160, hardware drivers 162 and administration software 164, and pay telephoning programs 165. It should be noted that pay telephoning programs 165, could be deployed on a second microprocessor associated with pay phone interface 106 (shown in FIG. 4).

The core program base 158 looks after such features as maintenance such as notifying the central server of a time to load more paper into the printer, provides a user interface, manages network connectivity and download features for downloading files from the central server and for providing pay phone functionality.

The architecture 150 further includes a virtual machine 166 which includes an embedded web browser component 168 and an audio video player 170. The web browser component 168 provides an interface between the user and the multimedia terminal and the audio video player provides visual images on the display 16 and audio/sound bytes on the one or more speakers 43 for advertising, for example.

Figure 6:
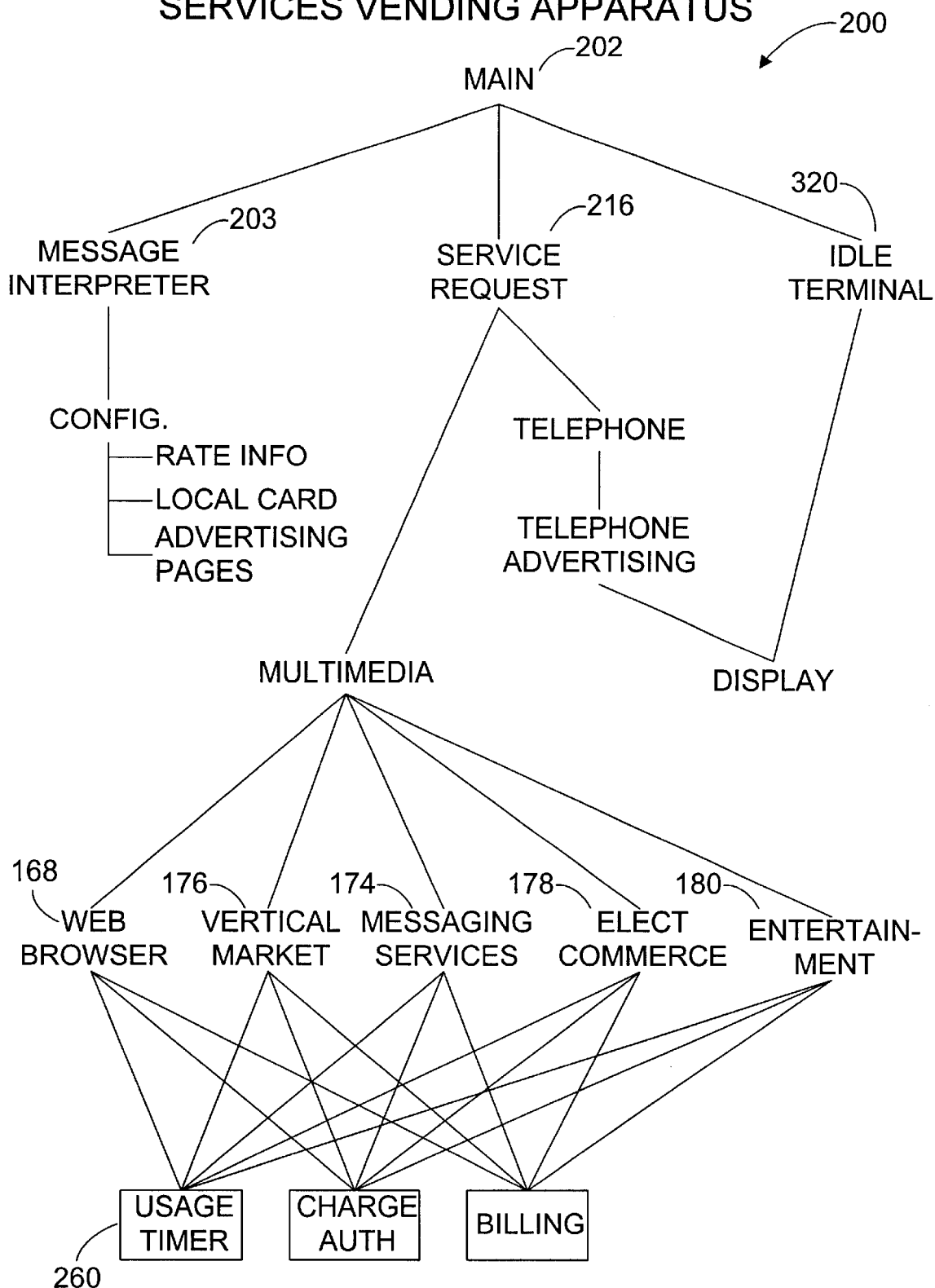
FIG. 6 is a schematic representation of programs in the apparatus according to the first embodiment of the invention.

The architecture further includes an application layer shown generally at 172 including a messaging services application 174, a vertical market application 176, an electronic commerce application 178 and an entertainment application 180. The messaging services application 174 includes features such as e-mail, voice e-mail and fax. The vertical market application 176 includes government services and banking. The electronic commerce application 178 includes ticket sales and virtual mall displays. The entertainment application 180 includes Internet browsing capabilities, gaming, chat rooms and newsclips.
FIG. 6

Referring to FIG. 6, a chart of high level programs stored in the non-volatile memory is shown generally at 200. Each of the programs listed in the chart is associated with the core program layer 158 shown in FIG. 5, with the exception of: (1) the custom web browser 168 which is associated with the virtual machine 166 of FIG. 5, and (2) the vertical market 176, (3) messaging services 174, (4) electronic commerce 178 and (5) entertainment 180 applications modules shown in FIG. 5.

Figure 7:
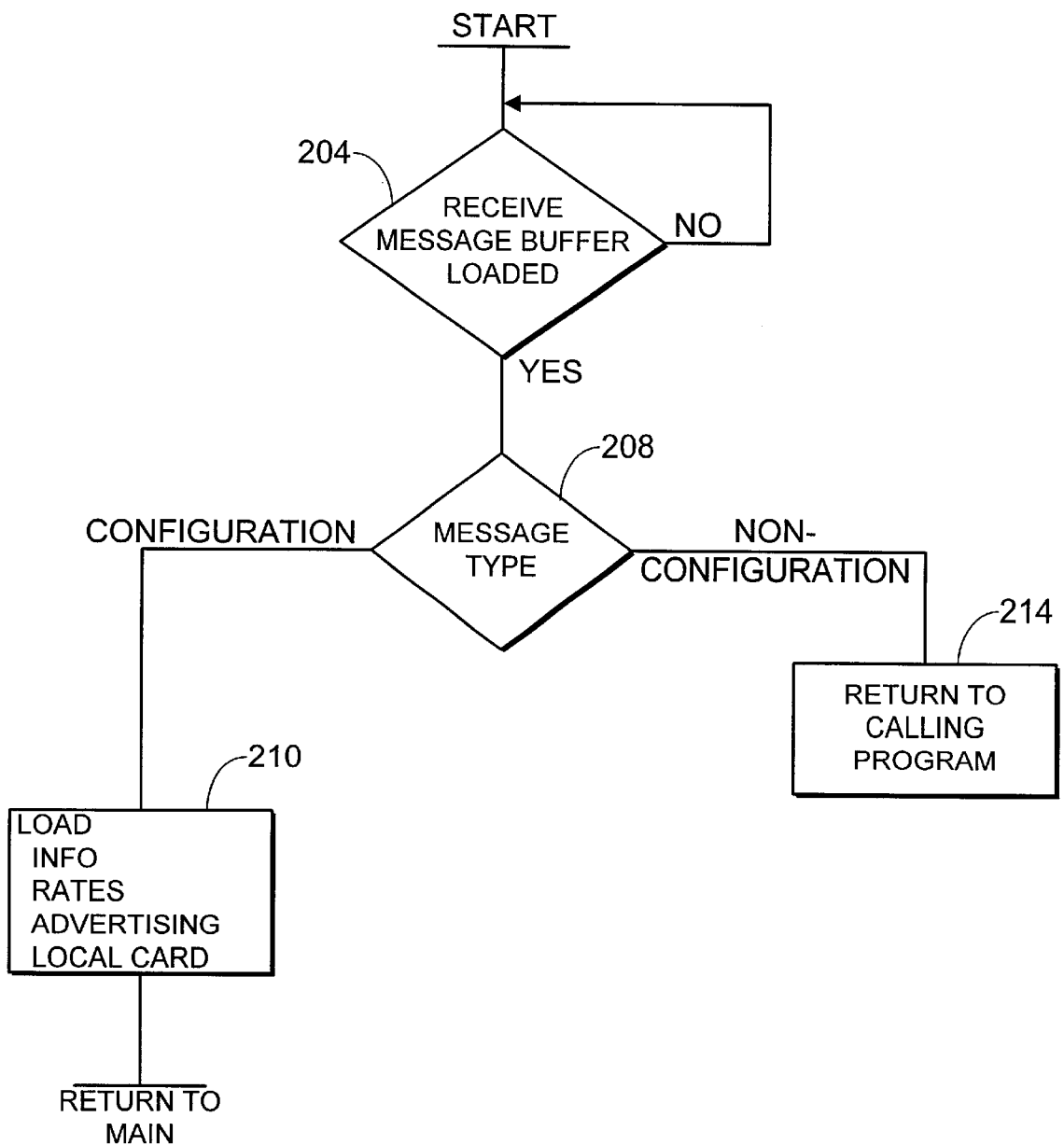
FIG. 7 is a flowchart of a message interpreter according to the first embodiment of the invention.

The programs include a main program 202 which the apparatus runs in the background. In response to an interrupt received at the first communication port 100 in FIG. 4, a message interpreter program is invoked.
FIG. 7
Message Interpreter Referring to FIG. 7, the message interpreter includes a block 204 which directs the microprocessor 82 shown in FIG. 4 to read the I/O port 88 to determine whether or not the receive message buffer 206 is loaded. If not, the microprocessor is directed to continue to test the I/O port 88 to determine when the buffer is loaded. If the buffer is not loaded within a timeout period, the microprocessor 82 is returned to the main program 202 shown in FIG. 6.

Referring to FIG. 7, if the receive message buffer is loaded, block 208 directs the microprocessor 82 to determine the type of message received. If the message is of a configuration type, it indicates that a configuration file has been downloaded from the central server. The configuration file may include information relating to rates, advertising, content, and local card clearing information. Alternatively, information in the configuration file could be downloaded directly from vendor server other content servers. Block 210 directs the processor to load this information into non-volatile memory 84 shown in FIG. 4. Thus, a configuration file 212 is stored in the non-volatile memory 84.

Upon completion of storing the configuration file, the microprocessor 82 is returned to the main program 202 shown in FIG. 6.

Figure 8:
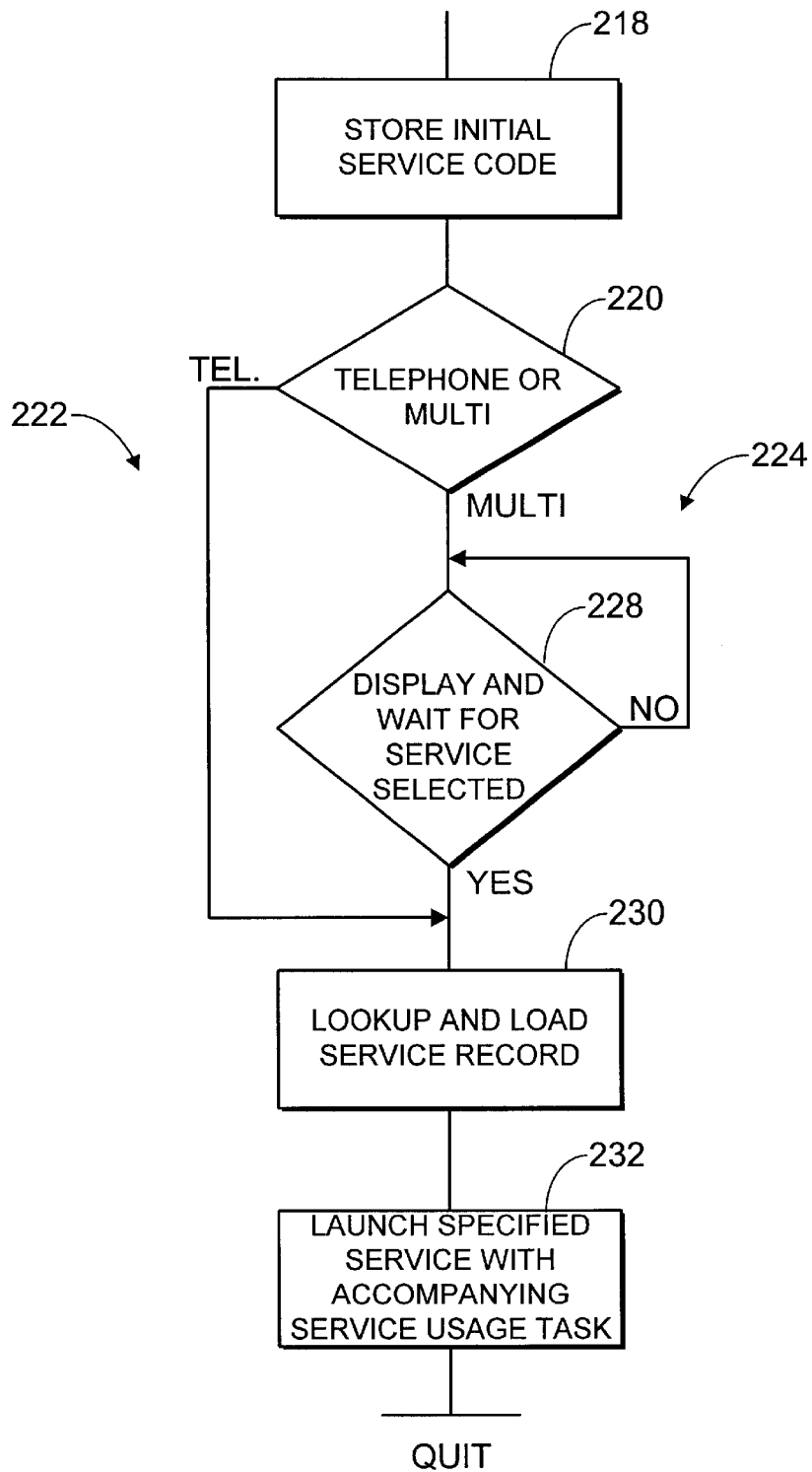
FIG. 8 is a flowchart of a service request program according to the first embodiment of the invention.

Referring to FIG. 7, if the message type read by the microprocessor 82 at block 208 is of the non-configuration type, block 214 directs the microprocessor 82 to return to the calling program, which in this embodiment, is the main program 202.
Service Selection Referring back to FIG. 6, if a user makes a service request, to use either a multimedia service or a telephone service offered by the apparatus, a service request program 216, shown in FIG. 8 is invoked. A service request for use of the pay telephone is provided by a user by simply lifting the handset 108 shown in FIG. 4, whereupon the sensor 101 detects connection to the central office line and provides a signal over the second communications port 102 to the I/O port to indicate to the microprocessor 82 that a request to use the telephone has been made.

On the other hand, pressing any key on the keyboard will be interpreted by the microprocessor 82 as a request for multimedia services.

Referring to FIG. 8, upon selection of a service by a user, a code indicating the type of service, telephone or multimedia, is produced, depending upon the state of the handset and whether or not a key on the keyboard has been actuated. Block 218 directs the processor to store this code as a type code to indicate whether telephone services or multimedia services have been requested. Block 220 then directs the microprocessor 82 to a telephone branch 222 or to a multimedia branch 224 specified by the service type code stored at block 218.

Alternatively, telephone services could be activated simply by lifting the receiver. This would send a signal to the second microprocessor associated with pay phone interface 106 (shown in FIG. 4). The second microprocessor would in turn, send another signal to I/O port 88 over control bus 102 which would send a signal to microprocessor 82 indicating that telephone services had been initiated. Further communication could occur between the second microprocessor and microprocessor 82 as the telephone service continued or its status changed.

If the user has requested a multimedia service, block 228 directs the microprocessor to cause to be displayed on the display 92, a menu of available multimedia services and to wait for a user selection of a desired service. The user does this by pressing on the touch screen 94 whereupon a message indicating the area of the touch screen touched, is provided to the microprocessor. The microprocessor interprets the message as an indication of the user's selection and on reference to a lookup table (not shown), an identification code for the selected service is obtained. The microprocessor 82 then augments the initial code previously stored in connection with the service request program (at Block 218 in FIG. 8) to produce a service identification code to indicate the specific multimedia service requested. If the user had selected to use the telephone, a service identification code associated with the telephone service is produced. Thus, a service identification code is produced to indicate the type of service requested by the user.

Block 230 then uses the service identification code to lookup a service record stored in non-volatile memory.

FIG. 9

Service Record

Figure 14:
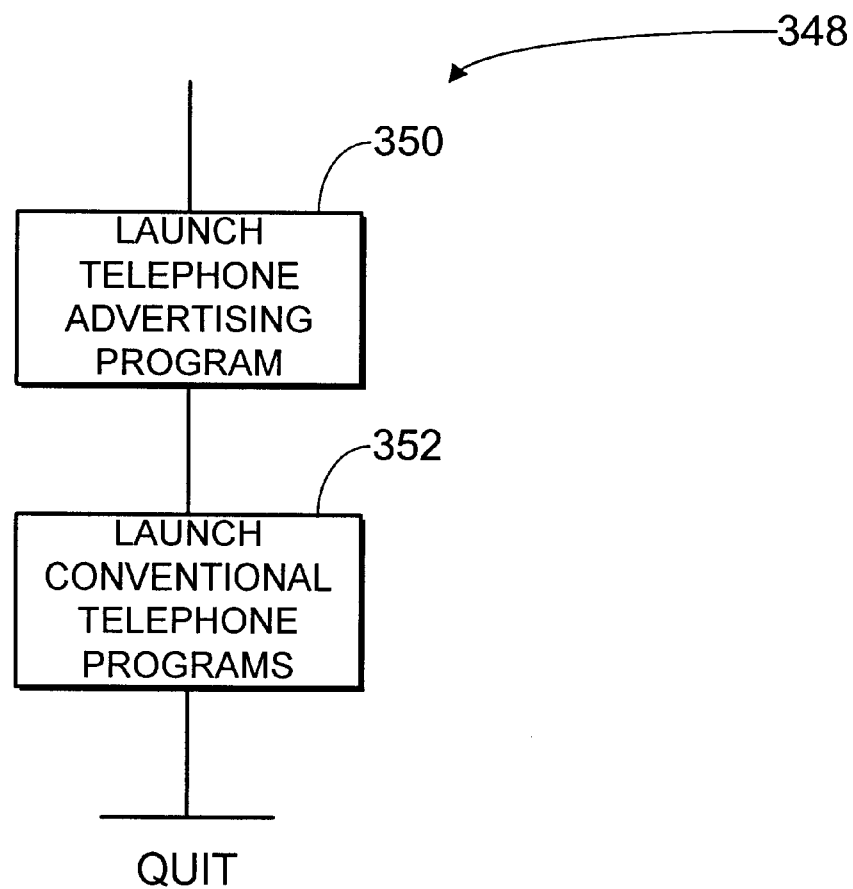
FIG. 14 is a schematic diagram of a service rate field in accordance with an embodiment of the invention.

Referring to FIG. 9, a service record 231 includes a service identification field 233, a service type field 235 and a service rate field 237. As shown in FIG. 14, the service rate field 237 could contain a number of sub-fields, which will be described in greater detail below. The contents of these fields are provided from the configuration file received from the central server. Alternatively, the contents of these fields could be provided from data stored in vendor or content server. Generally, the service record relates service identification with service types, service charge periods and associated service rate information. The service record associated with the service identification specified by the user is retrieved from memory and stored in a current service record buffer in a volatile memory.

Referring back to FIG. 8, block 232 directs the microprocessor 82 to launch the service specified by the contents of the service identification field 233 and at the same time to launch a corresponding service usage task associated with the requested service.

To launch one of the multimedia services, a web browser application, virtual market interface application, messaging service application or electronic commerce application is loaded and run, depending upon the service requested by the user. Alternatively, if the user has requested telephone service, a telephone application is launched. It will be appreciated that more than one application can be launched at a time and, therefore, it is possible for the user to simultaneously use telephone services and multimedia services at the same time.

Figure 10:
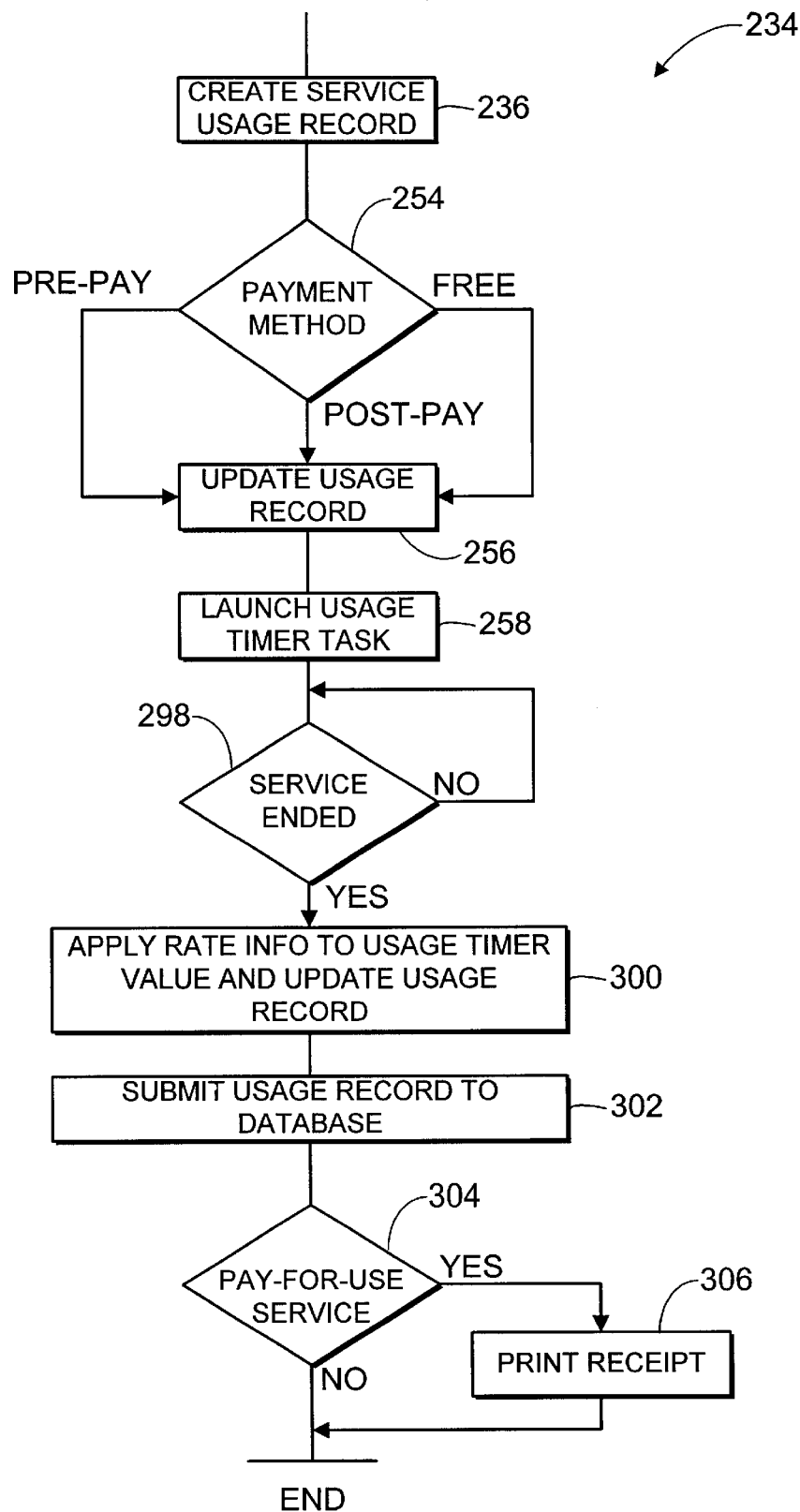
FIG. 10 is a flowchart of a service usage request program according to the first embodiment of the invention.

FIGS. 10 and 11

Referring to FIG. 10, the corresponding service usage task begins with block 236 which directs the processor to produce a service usage records as shown in FIG. 11. The service usage records includes a transaction identification field 240, a service identification field 242, a date/time field 244, a duration field 246, a charge field 248, a payment method field 250 and a card number field 252. Initially, the contents of each of these fields is zero, however, after a blank record has been created, the transaction identification field is loaded with a unique reference number to uniquely identify the transaction, the service identification field is loaded with the service identification of the service record shown in FIG. 9, the date and time field 244 is loaded with the date and time of the current transaction, and the duration charge payment method and card number fields 246–252 are left blank.

Referring back to FIG. 10, block 254 directs the processor to present a prompt on the display 92 to request the user to indicate the preferred payment method, if applicable. The use of some services may be free and, if so, the payment method block 254 will receive a code from the launched service indicating that such service is free. In this event, the service usage record 238 is unchanged at this point. If, on the other hand, the user inserts a credit card, the card reader presents to the microprocessor a code indicating that a credit card has been inserted in which case, the payment method is selected as post-pay. Alternatively, if the user inserts a debit-type card, a stored value smart card, or a pre-paid value card, a code indicating a pre-payment method is presented by the card reader to the microprocessor such that at block 254, the microprocessor interprets the preferred method of payment as pre-pay.

Referring to FIG. 11, in the case where the user has selected the post-pay payment method, card number information relating to the card to which charges are to be applied is stored in the card number field 252 and the payment method field 250 is loaded with a code indicating post-payment method. The duration and charge fields 246 and 248 are left blank.

Referring to FIG. 10, block 258 then directs the processor to launch a usage timer task associated with the service. As further set out in FIG. 10, blocks 298–306, the pay-per use service is delivered (block 298), a usage record is updated (block 300) and is submitted to the database (block 302) and a receipt is printed (block 306). Optionally, in block 306a, the kiosk user may be queried as to whether the user wants a receipt printed. Preferably, the kiosk user is queried regarding the preferred payment method between block 254 and block 256.

FIG. 12

Figure 12:
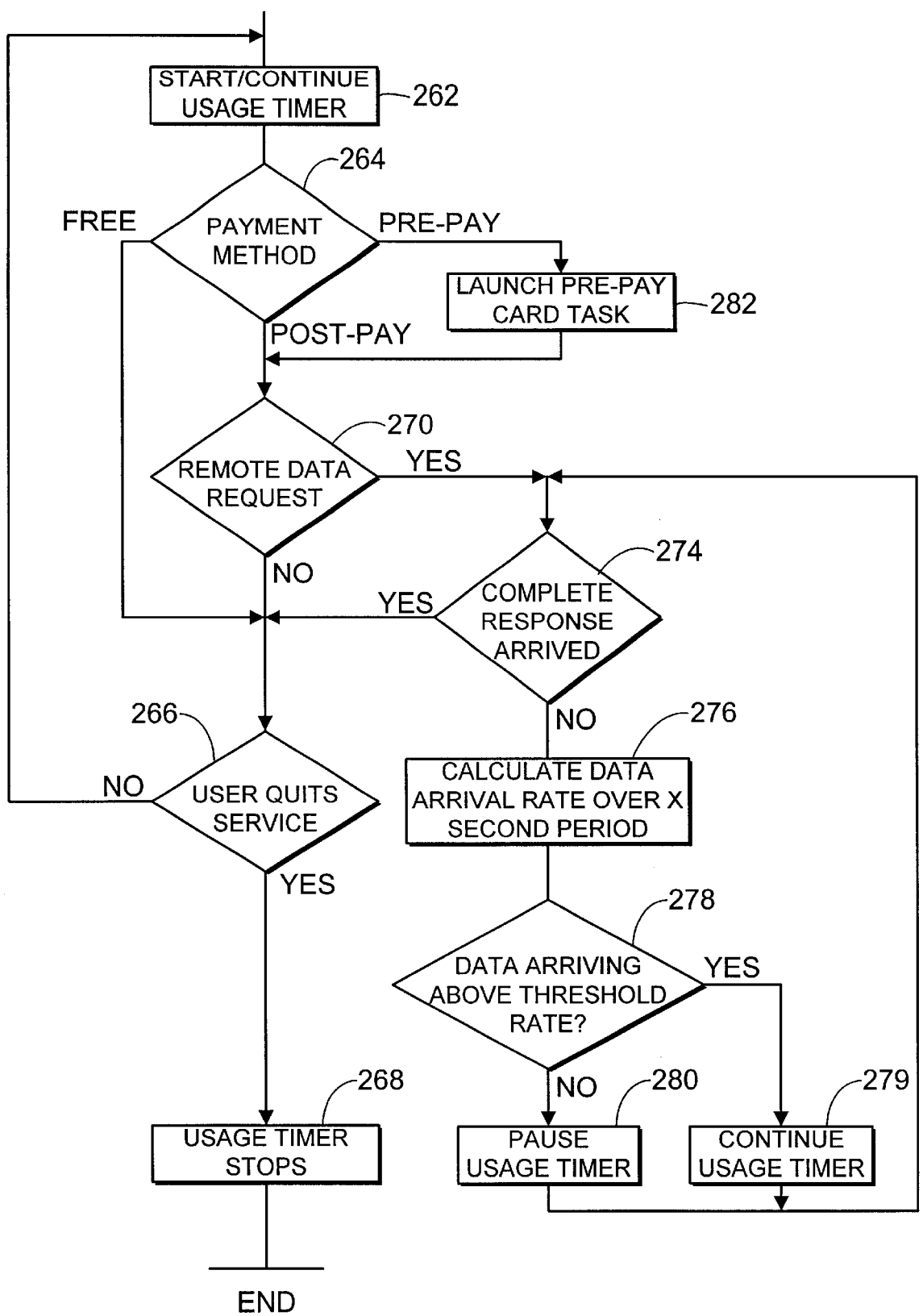
FIG. 12 is a flowchart of a usage timer task program according to the first embodiment of the invention.

Referring to FIG. 12, the usage timer task is shown generally at 260 in FIG. 12 and begins with a first block 262 which directs the processor to start a timer for cumulatively recording the time during which the corresponding service is in operation. Thus, there is a first timer which is enabled in response to request for access to at least one multimedia service at the public communications service vending apparatus. In this embodiment, the timer counts seconds.

It should be noted that a usage timer task is launched in association with each service requested by the user. Therefore, there are a plurality of timers associated with the multimedia services respectively, for simultaneously cumulatively recording times during which respective multimedia services are in operation and furthermore, such timers are enabled in response to respective requests for access to respective services. Block 264 then directs the processor to determine which payment method has been selected by the user and if the free payment method has been selected, the processor is directed to block 266 which determines whether or not the user has pressed an exit button on the touchscreen indicating the service is to be ended. If so, block 268 directs the usage timer to stop and the usage timer task is ended. If the user has not quit the service, as detected at block 266, the processor is directed back to block 262 which continues the operation of the usage timer and the above process is repeated.

When the user has requested the pre-payment method (smart card/debit note) post-payment method (credit card), block 270 directs the processor to determine whether or not the service has requested data from the remote server. If it has not, blocks 266, 268, 262 and 264 are repeated until data is requested.

When data is requested, block 274 directs the microprocessor 82 to read the first communications port 100 to determine whether or not a complete response has been received. It will be appreciated that the data request may require the transfer from the central server to the apparatus of a rather large file which may take some time to receive.

If a complete response has been received, blocks 266, 268, 262, 264, 270 and 272 are repeated until a situation exists where a request for data has been sent to the remote service, but a complete response has not yet been received. In this situation, block 276 directs the processor to determine a data receive rate at which data is received by observing the number of blocks of data received each second. The processor thus acts as a data receive rate measurement device.

Figure 16:
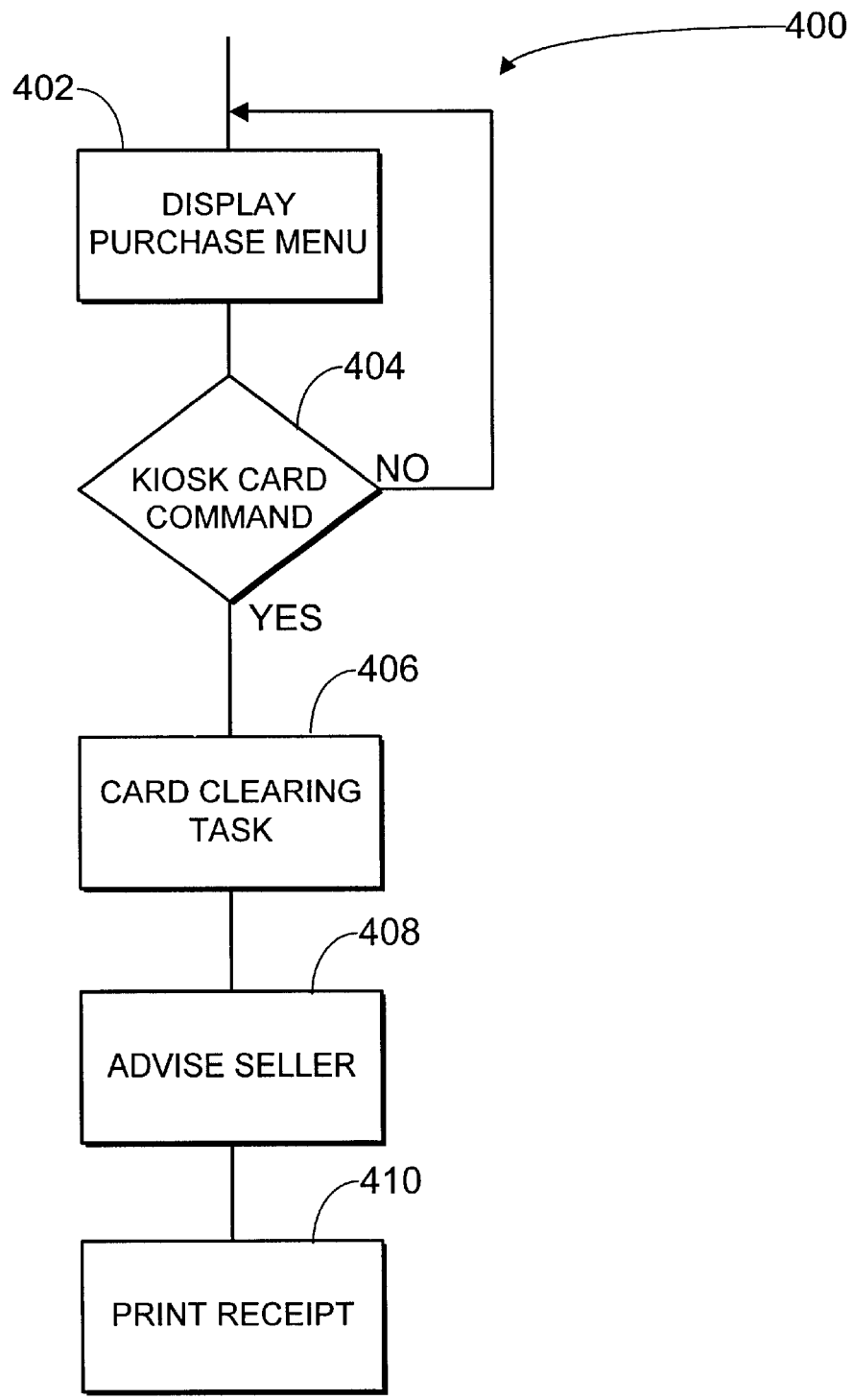
FIG. 16 is a schematic diagram of a bandwidth throttling field in accordance with an embodiment of the invention.

For certain pay-per-use services the amount charged may vary according to the data arrival rate. One of the subfields of service rate field 237 is the bandwidth throttling field 237*j*. Alternatively this field could be a separate table as shown in FIG. 16. As shown in FIG. 16 the bandwidth throttling field may have a number of subfields such as the service ID/1601, the data arrival rate field 1603 and the charge modifier field 1605. As shown in FIG. 12 in block 276 the data arrival rate is calculate over each x second period. If the data arrival rate is less than some amount, for example 500 bytes/s then the usage timer is incremented by x seconds times 0which equals zero. Different data arrival rates are used to modify the amount the usage timer is incremented. For example, if the data is 1000 bytes/s or greater, then the usage timer is incremented by X seconds times 1.0 or x seconds. As shown in FIG. 12, after the data arrival rate is calculated, then the data arrival rate is compared to those rates listed in column 1603 (in the bandwidth throttling field) in block 276*a*. Following this comparison a charge modifier from column 1605 is calculated in block 276*b*. A charge increment is calculated using (1) other service rate information from service rate field 237 as well as (2) information from the usage timer and (3) the charge-calculated modifier (block 276*c*). This charge increment is added to the cumulative amount charged in block 276*d*. Optionally, when the charge modifier is less than 100% a message is displayed to the kiosk user to notify him or her that due to slow data arrival, charges are being reduced.

Figure 13:
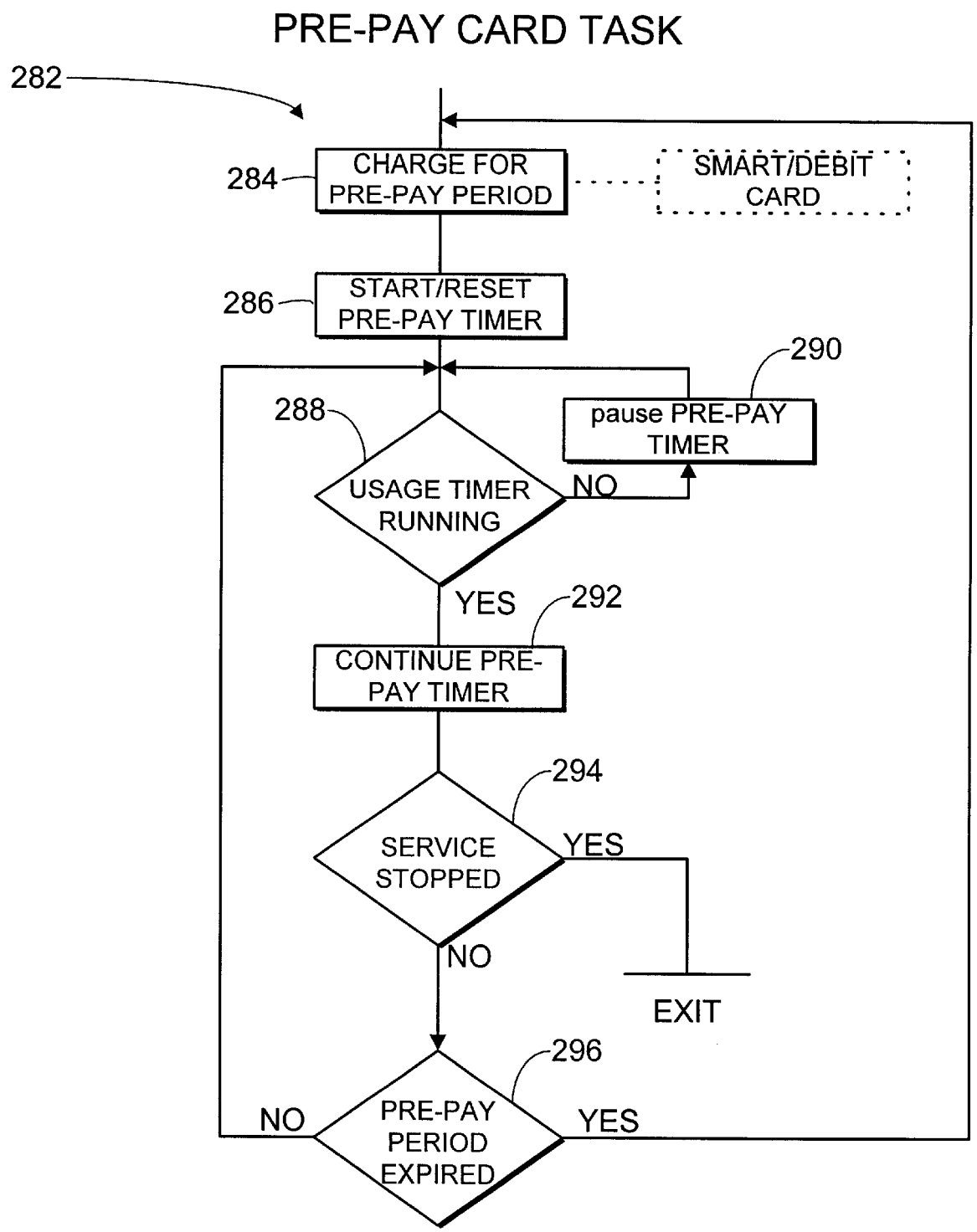
FIG. 13 is a flowchart of a card clearing task program according to the first embodiment of the invention.

Card Clearing Task
FIG. 13

Referring to FIG. 13, the card clearing task begins with block 360 which directs the processor to actuate the card reader to identify the type of card. Block 362 then directs the processor to a lookup table which is addressed to determine whether or not the card inserted is supported by the apparatus. If the card is not supported, block 364 directs the processor to reject the card. If the card is supported, however, block 366 directs the processor to perform a card format and valid data test on the data read from the card. If the card format is not valid, block 368 directs the processor to reject the card.

If the card information is valid, block 370 directs the processor to send the card data to the central server 26 or to another authorization server by way of a message sent through the request and reply pipe 68 shown in FIG. 3 to the transaction server interface 50.

It should be noted that validation of certain types of cards, such as stored value smart cards may occur entirely at the kiosk.

Referring back to FIG. 3, the transaction server then looks up local card clearing files stored in the database 62 to determine whether or not the card should be rejected and if, based on these files, the card should be rejected, a reply message to this effect is sent back to the apparatus where block 374 directs the processor to reject the card. If the server determines that the card should not be rejected, a message to this effect is sent back to the apparatus.

Next, as shown in block 376 a pre-payment amount is determined. Optionally, at this point the kiosk user may be queried if they wish to authorize a pre-payment amount. Alternatively, this query could occur before block 360. The pre-payment amount can be specified in the service record 231 associated with the pay-per-use service. In the case of a credit card or debit card, a message is sent to the appropriate authorization or validation server requesting authorization of the pre-payment amount in block 378. In the case of a smart card, a check is made to ensure the initial fee is available on the card in block 380. For example, for e-mail services the initial fee may be $20.00. If pre-authorization of the payment amount is rejected, the user is notified and returned to the kiosk main menu. As the user uses the pay-per-use service, information is gathered from the usage timer combined with information from the service rate field to determine a cumulative charge in block 382. In the case of a credit or debit card and a smart card the cumulative charge for the pay-per-use service is calculated in block 382.

Preferably, in the case of smart cards, in block 385 when the cumulative charge reaches a pre-determined token amount, for example five dollars, the token amount is deducted from the card.

In the case of debit or credit cards the determined cumulative charge calculated in block 384 is compared to the pre-authorized amount. When the cumulative charge meets or exceeds the pre-authorized amount block 378 is repeated.

Optionally, the kiosk may display the cumulative charge or the pre-authorized amount on the kiosk display.

Pay-Per-Use Parameters
FIG. 14

FIG. 14 shows the sub fields in the service rate field 237 (shown in FIG. 9). If stored as a separate table the service rate field contains a service identifier 237*a* so the rate field can be matched to the service record. Service rate field 237 has a number of sub-fields: the grace period field 237*b* gives the amount of time the user is allowed to use the service before they begin to be charged; the round up threshold field 237*c* provides the number of seconds above which a user is charged for a full minute of service (for example, if it is set to 31, then the user is charged for 1 minute once 31 seconds have expired); the rate per minute field 237*d* provides a charge per minute for the service; the currency code field 237*e* provides an indication of the local unit of currency; the initial fee field 237*f* provides the up-front cost of using the pay-per-use service which typically covers transaction fees, administration fees etc.; the free seconds field 237*g* indicates the number of seconds of service included in the initial fee (for example if the initial fee was $1.50 and the free seconds as 180 the user would be charged $1.50 and no additional fees would be charged until 3 minutes of use had elapsed); the conditions message field 237*h* holds a brief description of the conditions of the service, such as the rate, and is displayed to the end-user; the grace message field 237*i*, carries a brief message to explain the grace period if any, to the end user; the bandwidth throttling field 237*j*, contains a code indicating how charges may be modified if network throughput changes; the service loading field 237*k* contains a code indicating whether time is charged when the service is loading (for example with Internet Services); charge period field 237*l* contains a code indicating a charge period in seconds: The user is charged at the beginning of each period for a debit/credit card. The length of the period is determined from multiplying the charge period field 237*l* by the rate per minute field 237*d*. If taxes are applied the resulting amount is multiplied by tax field 237*m*. The resulting amount is the amount which is charged in each period to smart-card users or which is accumulated for kiosk users who pay by debit/credit card. For example, for some pay-per use services, no charge may be made when pages are loading, only when they have been completely loaded. Optionally, the service rate field may include sub-fields related to rates for printing consumables such as movie tickets, e-mail or receipts, or for storing files on a diskette or on a central server.

This information is passed to the multimedia kiosk when a multimedia service is requested so that billing information can be presented to the end user to charge the user if pay-per-use service is selected.

Figure 15:
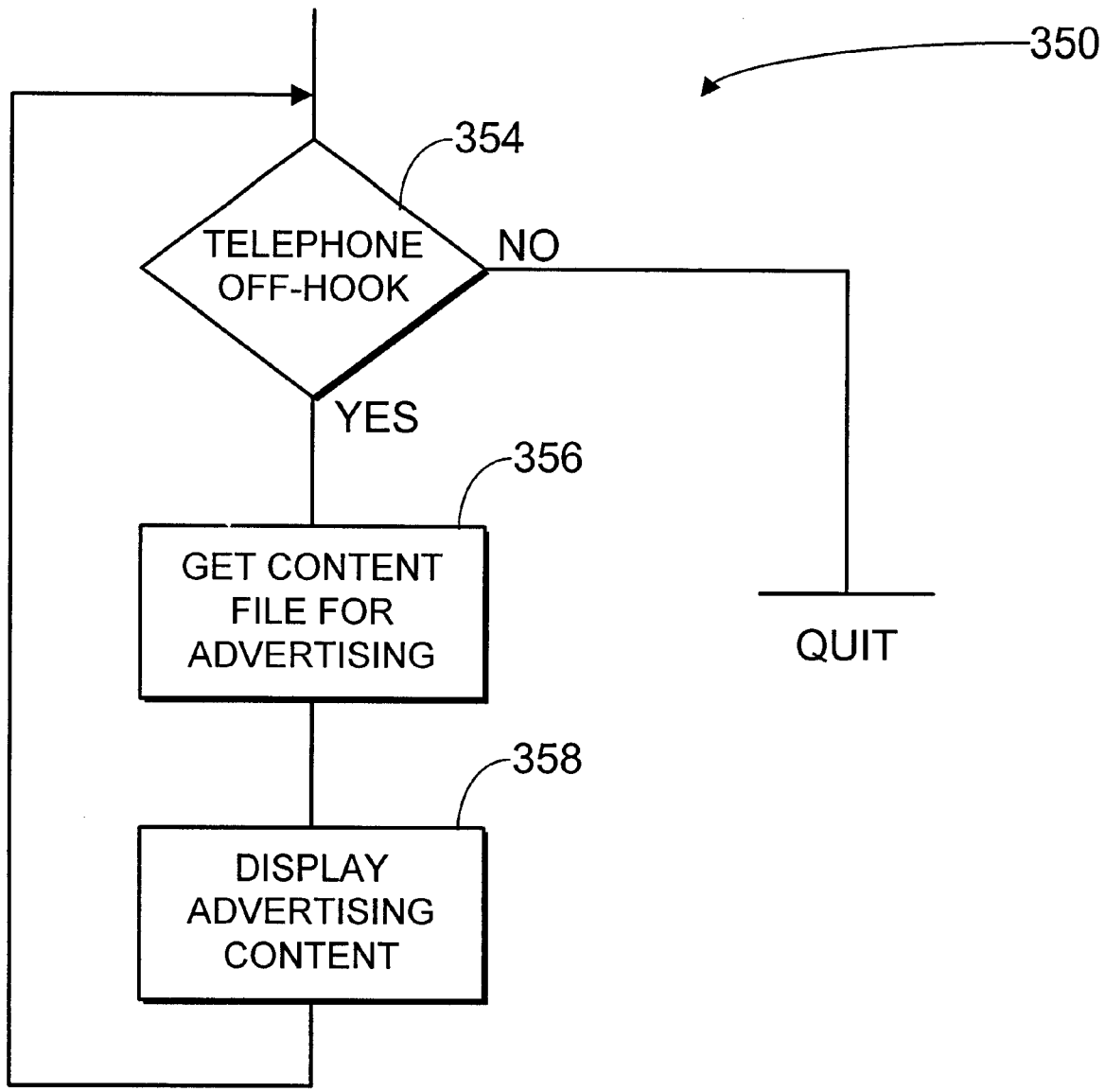
FIG. 15 is a flowchart of a billing information program according to an embodiment of the invention.

Referring to FIG. 8 after block 230 (lookup and load the service record 231) occurs billing information can be presented to the user. The process for this is shown in FIG. 15. After block 230 look-up and load service record, the billing rate information is parsed out of the records in block 230*a*. Then this billing rate information is presented to the user on the display 16 of kiosk 12 (shown in FIG. 1), in block 230*b*. The user is then queried by the system whether they wish to continue with the pay-per-use service in block 230*c*. If the user responds "No" then the user is returned to the kiosk main menu in block 230*d*. If the user responds "Yes" then pre- payment authorization or verification occurs in block 230*e*. If payment is authorized or verified, the pay-per-use service is provided to the end-user in block 232.

It should be noted that all or only a portion of the information contained in the sub-fields 237*b*–237*m* needs to be presented to the end-user.

While specific embodiments of the invention have been described and illustrated, such embodiments should not be considered illustrative of the invention only and not as limiting the invention as construed in accordance with the accompanying claims.

What is claimed is:

1. An apparatus for vending public multimedia services, the apparatus comprising:

a telephone;

a multimedia terminal;

said telephone and said multimedia terminal for receiving data at a rate that is variable on a second-by-second basis;

a payment receiver for receiving an authorization to accept charges for enabling use of at least one of said telephone and said multimedia terminals;

a file receiver for receiving a file, said file containing a cost-per-unit time for a service and a data arrival rate modifier for said service;

memory for storing said file;

a data rate measurer for periodically determining a rate at which data associated with said services is received; and a usage cost determiner for determining a usage cost based upon both a time of use of said service and said periodically determined rate at which data associated with said service was received.

2. The apparatus for vending public multimedia services according to claim 1, further comprising means for deducting a pre-payment amount from a payment card or account.

3. The apparatus for vending public multimedia services according to claim 1, further comprising a means for displaying billing information about cost of said service.

4. The apparatus for vending public multimedia services according to claim 3, further comprising a means for displaying a round-up threshold indicating what fraction of a unit of usage will be rounded up to a full unit of usage for said service.

5. The apparatus for vending public multimedia services according to claim 1, wherein said data rate measurer comprises means for calculating a data arrival rate over a period of time and comparing said calculated data arrival rate with a pre-stored value to generate a charge modifier.

6. The apparatus for vending public multimedia services according to claim 5, wherein said usage cost determiner comprises means for calculating a time of use of said service, multiplying said time of use by a cost-per-unit time for said service to determine a charge and then multiplying said charge by said charge modifier.

* * * * *